M. Bowes,
Pipe Cutter.
N° 20,387. Patented May 25, 1858.
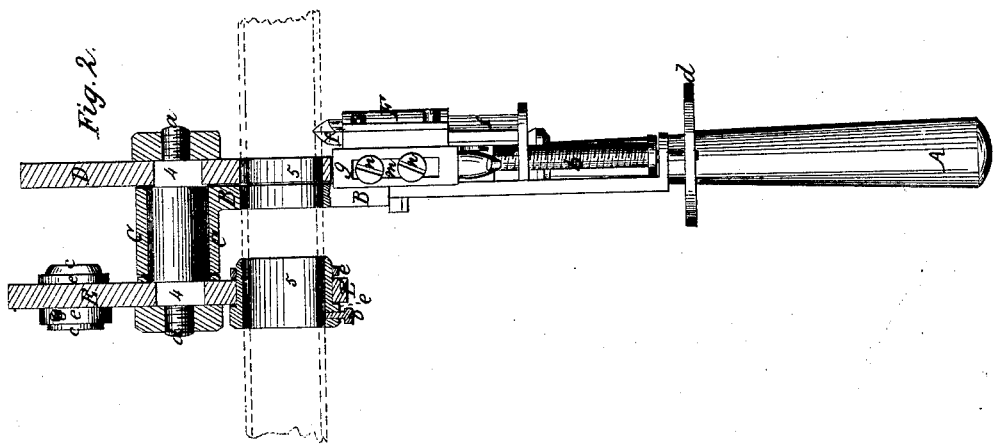
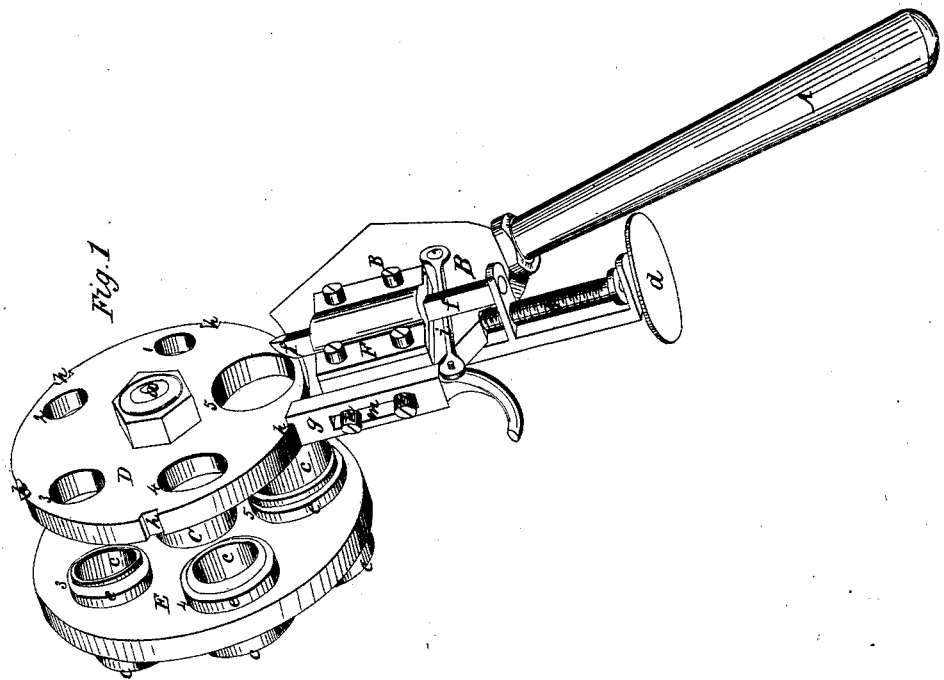

UNITED STATES PATENT OFFICE.

M. BOWES, OF CHARLOTTE, NORTH CAROLINA, ASSIGNOR TO HIMSELF AND GEO. B. WATERHOUSE, OF SAME PLACE.

MACHINE FOR CUTTING PIPE.

Specification of Letters Patent No. 20,387, dated May 25, 1858.

*To all whom it may concern:*

Be it known that I, MICHAEL BOWES, of Charlotte, in the county of Mecklenberg and State of North Carolina, have invented certain new and useful Improvements in Machines for Cutting Off Gas and other Pipes or Tubes; and I do hereby declare the following to be a full, clear, and exact description of the same, reference being had to the accompanying drawings, making a part of this specification, in which—

Figure 1 represents a perspective view of the entire machine; and Fig. 2, represents a vertical section through the same.

Similar letters of reference where they occur in the separate figures denote like parts of the machine in both of them.

My invention relates to a machine which is clasped or fastened to a gas or other pipe or tube, and turned thereon at any fixed point, for the purpose of cutting off said pipe or tube; and is so made as to be susceptible of cutting off pipes or tubes of the several various sizes used for gas, in a manner to be hereafter explained.

To enable others skilled in the art to make and use my invention, I will proceed to describe the same with reference to the drawings.

A, represents a handle or lever, projecting from a plate or stock B. On the end of this plate or stock B, there is a hub or sleeve C, to which the two disks D, E, are connected by a screw bolt $a$ passing through said disks and sleeve or hub. In one of these disks (D,) there are a series of holes 1, 2, 3, 4, 5, of the necessary diameter to receive the several sizes of gas pipe used—the perimeters of these holes, being at a uniform distance from the circumference of the disk, at their nearest points. In the other disk (E), and directly opposite the holes above named, is another series similar in number and size, but having a loose ring or sleeve $c$ therein, with flanges $e$ on both sides of the disk, so that while the rings may freely turn in the plate or disk, they cannot come out.

On the plate or stock B, there is a tool rest F, through which a pointed cutting tool $f$, is forced by a screw shaft $b$, having a thumb wheel $d$ on it, to force said cutter up to its work, and firmly hold it there. And on the side of the stock B, there is a bolt $g$, which is held in either one of the recesses $h$, $h$, &c., that may be required for the time being, by the spring $i$. The bolt $g$, is slotted at $m$, and set screws $n$, $n$ pass through said slot into the stock B.

The operation of the machine is as follows: The piece of gas pipe to be cut, is marked at the point where it is to be severed. The holes through the plates that correspond with the size of the pipe, are then brought around to the cutting tool $f$; the pipe is then passed through the holes in the plates, or the machine slipped over the pipe until the tool $f$ is opposite the mark where the pipe is to be severed; the set screw $o$, in the ring or sleeve $c$, is then run down upon the pipe which prevents the machine from slipping endwise on the pipe, but at the same time it can be freely turned around on the pipe or tube. Now, run up the cutting tool $f$, against the pipe, by the screw shaft $b$, and take hold of the lever or handle A, and turn it around on the pipe and the cutter soon cuts out a groove deep enough to break apart the pipe. When a pipe or tube of a different size to the one previously cut is to be operated on, draw the bolt $g$ back, and turn the disks until the proper sized holes are at the tool $f$, let go the bolt and the disks are then firmly locked at that point and proceed as above stated. This makes a convenient machine or tool for gas fitters—one tool serving for all the different sizes of pipe used.

The double disks afford a long bearing on the pipe which keeps the tool steady; and I make the upper one D, a disk, because I find it most advantageous, but some other rest or support might be substituted for that disk, without departing from the characteristics of my invention.

Having thus fully described the nature and object of my invention what I claim therein as new and desire to secure by Letters Patent is,

In combination with the cutter, the two revolving disks with their series of holes— the holes of one disk being furnished with loose sleeves or rings for the purpose of adapting the machine to the cutting off of pipes of various sizes, as herein set forth.

MICHAEL BOWES.

Witnesses:
 A. B. STOUGHTON,
 E. COHEN.